United States Patent
Durand, Jr. et al.

(10) Patent No.: US 9,080,067 B2
(45) Date of Patent: Jul. 14, 2015

(54) SURFACE TENSION OF INKS FOR HIGH SPEEDING PRINTING

(75) Inventors: Richard R. Durand, Jr., Oradell, NJ (US); Ryszard Sprycha, Carlstadt, NJ (US); Mathew Mathew, Cedar Grove, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 13/581,240

(22) PCT Filed: Mar. 1, 2011

(86) PCT No.: PCT/US2011/026671
§ 371 (c)(1),
(2), (4) Date: Aug. 24, 2012

(87) PCT Pub. No.: WO2011/109385
PCT Pub. Date: Sep. 9, 2011

(65) Prior Publication Data
US 2012/0321794 A1    Dec. 20, 2012

Related U.S. Application Data

(60) Provisional application No. 61/309,158, filed on Mar. 1, 2010.

(51) Int. Cl.
| | | |
|---|---|---|
| *C09D 11/02* | (2014.01) | |
| *B05D 1/28* | (2006.01) | |
| *B41M 1/04* | (2006.01) | |
| *C09D 11/033* | (2014.01) | |

(52) U.S. Cl.
CPC  *C09D 11/02* (2013.01); *B05D 1/28* (2013.01); *B41M 1/04* (2013.01); *C09D 11/033* (2013.01)

(58) Field of Classification Search
USPC ........................................ 106/31.13; 347/100
See application file for complete search history.

(56) References Cited

U.S. PATENT DOCUMENTS

| | | | |
|---|---|---|---|
| 6,225,369 B1* | 5/2001 | Jeon ................................. | 522/81 |
| 6,270,389 B1* | 8/2001 | Kobayashi et al. ............. | 445/24 |
| 2006/0001726 A1* | 1/2006 | Kodas et al. .................. | 347/105 |
| 2009/0165937 A1* | 7/2009 | Inoue et al. ................... | 156/230 |

FOREIGN PATENT DOCUMENTS

| | | |
|---|---|---|
| JP | 05-271595 | 10/1993 |
| JP | 07-138516 | 5/1995 |
| JP | 2001-146563 | 11/1999 |
| JP | 2007-112964 | 5/2007 |
| JP | 2007-112965 | 5/2007 |

OTHER PUBLICATIONS

Office Action issued on Sep. 2, 2014 in connection with Japanese Application No. 2012-556170.

* cited by examiner

*Primary Examiner* — William Phillip Fletcher, III

(74) *Attorney, Agent, or Firm* — Charles C. Achkar; Ostrolenk Faber LLP

(57) ABSTRACT

A method of formulating ink for high-speeding printing includes controlling a surface tension of the ink to equal to or greater than 26 mN/m, equal to or greater than 28 mN/m, or equal to or greater than 30 mN/m. The surface tension is measured when the ratio of the total non-volatiles volume fraction of the ink to the maximum total non-volatiles volume fraction of the ink is a ratio between about 0.40 and about 0.90. An ink for high-speed printing includes one or more resins, one or more colorants, one or more solvents, and one or more additives. The ink can be a flexographic ink, a rotogravure ink, a heatset offset ink, or a publication gravure ink. A print of the ink includes less than 1% of pinholes by area. A method of printing includes preparing an ink and applying the ink to a substrate. The ink has a surface tension of equal to or greater than 26 mN/m, and the substrate moves at a speed of greater than 1200 feet/min.

25 Claims, 3 Drawing Sheets

Surface tension of printing inks (measured by the Wilhelmy plate method) as a function of TNV(%) (total non-volatiles).

Surface tension of printing inks (measured by the Wilhelmy plate method) as a function of the ratio of the total non-volatiles volume fraction to the maximum total non-volatiles volume fraction.

Ink #1　　　Ink #2　　　Ink #3　　　Ink #4

Photomicrographs of Inks #1-4

Surface tension of printing inks (measured by the Wilhelmy plate method) as a function of TNV(%) (total non-volatiles).

Surface tension of printing inks (measured by the Wilhelmy plate method) as a function of the ratio of the total non-volatiles volume fraction to the maximum total non-volatiles volume fraction.

Ink A                     Ink B

Photomicrographs of Inks A and B

SURFACE TENSION OF INKS FOR HIGH SPEEDING PRINTING

This application claims the benefit of U.S. Provisional Patent Application No. 61/309,158, filed on Mar. 1, 2010, which is hereby incorporated by reference for all purposes as if fully set forth herein.

FIELD OF THE INVENTION

The present invention relates to the surface tension of inks for high speeding printing. More specifically, the present invention relates to controlling the surface tension to enhance the quality of printing at high speed.

BACKGROUND OF THE INVENTION

Flexography is one of widely used methods of printing onto foil, plastic film, corrugated board, paper, paperboard, cellophane, or even fabric. In fact, since the flexographic process can be used to print on such a wide variety of materials, it is often the best graphic arts reproduction process for package printing.

The anilox cylinder serves as the heart of the flexographic press. The use of an ink-metering anilox cylinder, which is engraved with a cell pattern, enables an even and fast ink transfer to the printing plate. The configuration of the cells in the anilox roller, the pressure between the rollers, and the use of a doctor blade mechanism control the amount of ink transferred to the substrate. The shape and volume of the cells are chosen to suit the anilox surface (chrome or ceramic), the doctoring system, the press capabilities, the printing substrate, and the image type (solid or halftone). Advances in anilox technology have resulted in laser-engraved ceramic anilox rollers offering tougher and longwearing rollers with greatly improved ink release characteristics compared to conventional mechanically engraved chrome roller technology.

Flexographic prints can be printed with a flexible printing plate that is wrapped around a rotating cylinder. The plate is usually made of natural or synthetic rubber or a photosensitive plastic material called photopolymer. It is usually attached to the plate cylinder with double-sided sticky tape. Flexography is a relief printing process, meaning that the image area on the printing plate is raised above the non-image area. The ink is transferred from the plate to the substrate in the printing nip. Flexography is a direct method of printing, i.e. the printing plate transfers the ink directly to the substrate. Due to improved registration, the most popular type of press is the central-impression (CI) press where printing units are arranged around a single central impression cylinder.

In general, the higher the speed of the press, the wider the press will be. When the press is wider and faster, the diameter of the anilox roller must be greater in order to prevent damage to the roller due to deflection and bending. A 50-inch (ca 127 cm) machine has a 6-inch (ca 15 cm) diameter anilox cylinder. For high speed presses the time necessary for the ink to travel from the anilox-plate nip to the printing nip is very short. Linear speeds in excess of 1800 ft/min (ca 0.549 km/min) are considered high speed for printing flexible substrates, and presses with the capability of printing at a linear speed of 3300 ft/min (ca 1 km/min) are now appearing on the market.

The linear speed of 3300 ft/min (ca 1 km/min) is equal to a linear velocity of 35 miles per hour (ca 56.3 km/hr), and conventional plates and the double-sided sticky tape will eject from the press at this speed. In place of plates and double-sided sticky tape, direct laser engraved elastomer sleeves are used for printing at these velocities. The usual chambered doctor blade has a two-inch gap between the blades, and the dwell time for this distance at 3300 ft/min (ca 1 km/min) is less than the time of a high speed shutter on a 35 mm camera. During that interval, the air present in the cells must be displaced with ink, and the air must be cycled out from the chamber. At linear speeds up to 2300 ft/min (ca 0.701 km/min), normal motors can be used; however, at linear speeds over 2300 ft/min water-cooled motors are preferred.

Many printers require inks and coatings to be printed at high speeds in order to improve the cost effectiveness of their operations. Flexographic printing linear speeds generally range up to 2000 ft/min (ca 0.609 km/min), and that speed can be expected to increase. At increasing linear speeds, for example greater than 1200 ft/min (ca 0.366 km/min), and especially 1800 ft/per minute (ca 0.549 km/min), the printability of the ink begins to deteriorate and print defects can be observed. This defect can be described as randomly distributed, irregularly shaped missed areas of printing. These defects are believed to result from the inability of the ink to wet out the surfaces of the printing plate and/or substrate, or from the distinct mechanistic demands associated with a high speed printing press configuration as discussed in the above paragraphs.

In opposite to flexography the gravure printing is an example of intaglio printing so that the image area is etched or engraved into a printing cylinder and is below the non-image area. The un-etched (not engraved) areas of the cylinder represent the non-image areas. The cylinder rotates in the ink fountain and the excess of ink is wiped off the cylinder by a flexible steel doctor blade. The ink remaining in the recessed cells forms the image by direct transfer to the substrate (paper or other material) as it passes between the plate cylinder and the impression cylinder nip.

Gravure inks are fluid inks with a very low viscosity that allows them to be drawn into the engraved cells in the cylinder and then transferred onto the substrate. Flexographic and gravure inks are very similar and the basic constituents are essentially the same.

The transfer of ink to the substrate may be one of the most important factors affecting the quality of the final printed product. Due to dynamics of linear high-speed presses, conventional inks used for slower speeds will breakdown at high speeds, creating print defects. Any print defect will negatively affect productivity and the inherent printing advantages of using linear high-speed presses.

Typical flexographic/gravure printing inks contain resins, solvents, colorants, and additives. The resins include rosin esters, polyamides, polyurethanes, nitrocellulose, and others. The solvents used in flexographic/gravure inks are for example: alcohols, esters, glycol ethers, hydrocarbons and other solvents.

It is known that one of the factors important for good printability is the surface tension of printing ink, and it is commonly accepted that low surface tension is necessary for good ink spreading and substrate wetting. For example, solvent-based flexographic inks have inherently low surface tension because of the solvents used (e.g., alcohols, esters, ethers, etc).

Good printability may be controlled by the appropriate balance of interfacial properties at all interfaces created on the press during printing process. For example, in flexographic printing the surface energy of printing plates cannot be too low. On low-energy surfaces the ink may not form a continuous ink film, or, even if formed, the ink film may break very easily. In both cases, the print obtained will be defective because some areas of the image will not be covered with ink, e.g., pinholing. Another cause of pinholing may be uneven ink lay on the printing plate in the printing nip—due to film splitting in the nips (ink filaments) and inadequate ink film leveling.

Ink film exiting the anilox roll-printing plate nip undergoes splitting via cavitation and filament formation. As the ink is carried further away from the nip, the surfaces of the anilox cylinder and plate cylinder continue to separate, the cavities expand vertically and ink filaments are formed between the cavities. The subsequent cavities and filaments are formed as long as ink continues to emerge from the nip during printing. The filaments elongate and become thinner as they continue their travel away from the nip. The rate at which filaments elongate, and then rupture and level, depends on the printing speed, viscoelastic properties of ink, anilox roll and plate characteristics, ink surface tension, ink film thickness, etc. The ink surface tension and gravitational forces as well as developed surface-tension-gradient effects (Marangoni flow, which arise during drying) will decide about leveling effects—ink film flatness.

As a result of filament formation and break-up the surface of wet ink film exiting the nip is irregular (wave and/or worm-like pattern) and will tend to smooth during the process of leveling. Leveling is a process of eliminating surface irregularities of a continuous ink film under the influence of the ink's surface tension. It is an important step in obtaining a smooth, flat and uniform ink film. The factors that resist leveling are viscosity, elasticity and surface tension gradient (responsible for upward flow). The process of leveling depends on many parameters such as: the ink film thickness, extent and frequency of surface irregularities, ink surface tension, viscosity etc. However, the surface tension and viscosity of the ink play a major role:

$$l_s \sim \frac{\gamma_l}{\eta} \quad (1)$$

where: $l_s$ is the leveling speed; $\eta$ is the ink viscosity and $\gamma_1$ is surface tension of ink.

The leveling speed increases with increasing surface tension of the ink and decreasing ink viscosity. During drying, ink properties will change due to loss of solvent by evaporation—increase of viscosity (increased resistance to leveling) and surface tension change. The details of changes during drying and impact on coating defects are occurring on very short timescales during printing and specific models have been not been successfully implemented for complex systems. Two particular fundamental studies of note are the work of Weidner et. al., Journal of Colloid and Interface Science, 179 pp. 66-75 (1996) and Yiantsios and Higgins, Physics of Fluids, 18 pp. 082103-1 to 082103-11 (2006). Both these studies attempt to model phenomena in films in order to describe the potential outcomes during the drying and relationship between compositional changes and surface tension within a simulated coating. There are, however, no descriptions describing how the knowledge of compositional impact on changes in surface tension can be used to create a preferred state of film performance.

Flexographic inks may contain ingredients of differing surface tension and volatility (solvent blends). In such systems a local surface tension gradient may be formed during drying (solvent evaporation—change in ink composition and evaporative cooling) of the ink film. Local ink flow connected to the surface tension gradient would counteract leveling forces due to surface tension and gravity.

The term leveling is often used by printers and ink makers to describe ink spreading on the substrate. It should be emphasized that spreading and leveling are two different processes. Though the surface tension of an ink or coating, $\gamma_1$, plays an important role in both processes, the effect of surface tension on ink spreading is opposite to its effect on leveling. To achieve good spreading, the surface tension of the ink should be as low as possible; for good leveling, the surface tension should be as high as possible. In practical applications a compromise usually has to be reached regarding the l value to achieve optimum leveling and spreading.

The management of surface tension of inks has primarily focused on achieving proper surface tension for wetting within the print process during image transfer as well as for the substrate of which the final printed film resides. Wetting is usually focused at maintaining lower surface tension which can be at odds with desire to maintain high surface tension to insure print performance.

The inventors of the present invention discovered that formulation design which takes into account how the surface tension evolves during drying can lead to good print performance, particularly at high speeds. In high speeding printing, to have good print performance may be a challenging task as the time given to the ink film surface to level (traveling time from the anilox roll-plate cylinder nip to the printing nip) is very short, about 0.015 s (assuming printing speed of 2000 fpm and the distance between nips of 6 inches). The inventors of the present invention, however, found that good print performance can be achieved by the appropriate ink formulation. Ink that show good leveling properties should have low viscosity and maximal high surface tension, and should not develop (or to a minimal extent only) the surface tension gradient during ink drying (as long as the ink is in the liquid form). The values of all of the above parameters should be optimized and to be in the range acceptable by flexographic printing process.

SUMMARY OF THE INVENTION

The present invention discloses a method of formulating ink for high-speeding printing, and the method includes measuring the surface tension of the ink and controlling the surface tension of the ink to equal to or greater than 26 mN/m, to equal to or greater than 28 mN/m, or to equal to or greater than 30 mN/m when the ratio of the total non-volatiles volume fraction of the ink to the maximum total non-volatiles volume fraction of the ink is a ratio between about 0.40 and about 0.90, a ratio between about 0.50 and about 0.80, or a ratio between about 0.60 and about 0.75. The ink can be a flexographic ink, a rotogravure ink, a heatset offset ink, or a publication gravure ink. The surface tension can be controlled by selecting resins, solvents, and additives in the ink. The ink can be adapted for printing at a speed of greater than 1200 feet/min or at a speed of greater than 1800 feet/min.

The present invention discloses an ink for high-speed printing, and the ink includes one or more resins, one or more colorants, one or more solvents, and one or more additives. The surface tension of the ink can be equal to or greater than 26 mN/m, equal to or greater than 28 mN/m, or equal to or greater than 30 mN/m when the ratio of the total non-volatiles volume fraction of the ink to the maximum total non-volatiles volume fraction of the ink is a ratio between about 0.40 and about 0.90, a ratio between about 0.50 and about 0.80, or a ratio between about 0.60 and about 0.75. The one or more resins can be polyamides, polyurethanes, rosin esters, metallized rosin esters, nitrocellulose, phenolic resins, modified rosin phenolic resins, alkydes, hydrocarbon resins, asphalts, or metallic resonates, and can be about 5 to 30 wt % of the ink. The one or more colorants can be about 4 to 25 wt % of the ink. The one or more solvents can be water, ethanol, normal propyl alcohol, normal propylacetate, isopropylacetate, ethylacetate, diacetone alcohol, propylene glycol monopropyl ether, dipropylene glycol monopropyl ether, propylene glycol monopropyl ether acetate, dipropylene glycol monopropyl ether acetate, petroleum distillates, toluene, or xylenes, and can be about 40 to 70 wt % of the ink. A print of the ink can include less than 1% of pinholes by area.

The present invention discloses a method of printing, and the method includes preparing an ink and applying the ink to a substrate, the substrate moving at a speed of greater than 1200 feet/min. The ink having a surface tension of equal to or greater than 26 mN/m, equal to or greater than 28 mN/m, or equal to or greater than 30 mN/m when the ratio of the total non-volatiles volume fraction of the ink to the maximum total non-volatiles volume fraction of the ink is a ratio between about 0.40 and about 0.90, a ratio between about 0.50 and about 0.80, or a ratio between about 0.60 and about 0.75.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 1:
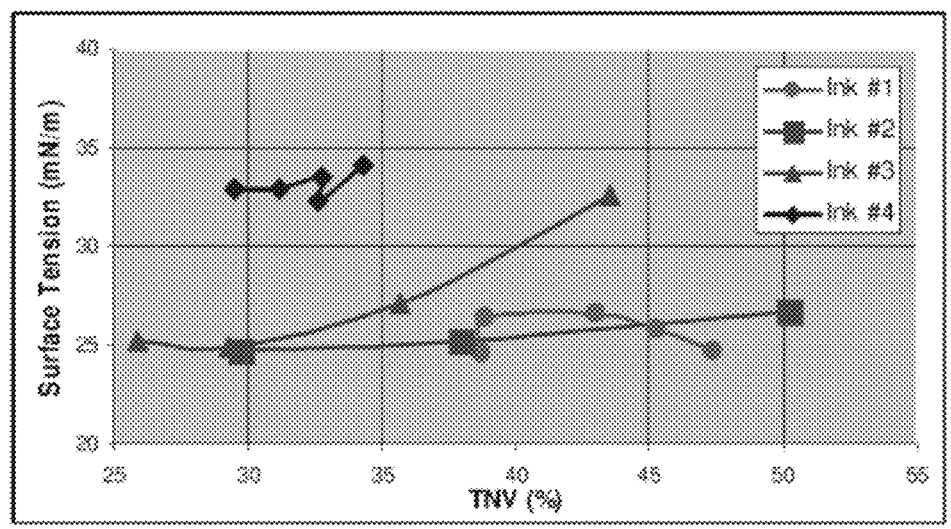
FIG. 1 shows the plot of the surface tension of the four inks (#1-4) as a function of TNV (%), where TNV (%) denotes the total non-volatiles volume fraction (percentage), a parameter commonly used in ink industry rather than solids fraction.

Reference will now be made in detail to embodiments of the present invention, example of which is illustrated in the accompanying drawings.

The inventors of present invention discovered that the surface tension of the ink can be used as a guiding formulation parameter inks used under high speed printing conditions. The ink can be a flexographic ink, a rotogravure ink, a heatset offset ink, or a publication gravure ink, and can be solvent based. There is a commonly accepted opinion in the printing industry that the surface tension of the inks should be low to achieve good spreading and wetting properties. However, the significance of surface tension in the high speed printing is not established well.

Pinholing is one of the common printability problems for the high-speed printing, and thus for the quality of the print derived therefrom. Because the pinholing relates to how the ink levels on the plate and is subsequently transferred to the substrate at high speed printing, the mechanism of ink film leveling becomes important to enhance printing quality and reduce pinholing.

The inventors of present invention discovered that one factor relating to the pinholing is the surface tension of the ink. That is because the surface tension of printing ink controls ink film leveling on the printing plate—the higher the surface tension the faster ink leveling. For pinhole-free printing, the ink film on the plate must level (be smooth and flat) before reaching the printing nip. In International Application No. PCT/US2011/026678, titled "Viscoelasticity of Inks For High Speeding Printing" and filed on Mar. 1, 2011, some of the inventors of the present invention discovered that the ink viscoelasticity can be used as a guiding formulation parameter for inks, especially those used under high speed printing conditions. International application PCT/US2011/026678, "Viscoelasticity of Inks For High Speeding Printing" is hereby incorporated herein by reference for all purposes.

There are various mechanisms responsible for the surface tensions and their modifications. These skilled in the art would know various ways to modify the surface tensions of inks. For example, the surface tension of an ink can be modified by selecting resins, solvents, and additives in the ink.

The ink for high speed printing includes resins or binders, dispersed colorants (optional), solvents, and various additives. The ink resins may include polyamides, polyurethanes, rosin esters, metallized rosin esters, nitrocellulose, phenolic resins, modified rosin phenolic resins, alkydes, hydrocarbon resins, asphalts, metallic resonates, or other printing ink resins. The dispersed colorants may be of any of a number of various pigments, pigment dispersions, or other colorants. The solvents include any of a number of organic solvents such as for example those selected from various alcohols, esters, hydrocarbons and glycol ether solvents. Typical examples include ethanol, normal propyl alcohol, normal propylacetate, isopropylacetate, ethylacetate, diacetone alcohol, propylene glycol monopropyl ether, dipropylene glycol monopropyl ether, propylene glycol monopropyl ether acetate, dipropylene glycol monopropyl ether acetate, petroleum distillates, toluene, and xylenes. The solvent component may also include water in an amount of up to about 5 wt %, and preferably about 0.5 to 2% when present.

An extensive listing of commercially available resins, solvents, and colorants, as well as other conventional components, can be found in The Printer's Manual, RIT Cary Graphic Arts Press (2005), which is hereby incorporated herein by reference. In general, the binder resin component is about 5 to 30 wt % of the composition, preferably about 10 to 15 wt %, the solvent is about 40 to 70 wt % of the composition, preferably about 60 to 70 wt %, the colorant when present is about 4 to 25 wt % of the composition, preferably about 15 to 18 wt %, and the other components make up the balance. Water, when present, is up to about 5 wt %, preferably about 0.5 to 2%, in so-called solvent-based inks, when it is not the main solvent.

The binder system of the ink formulations is selected in order to provide the range of printing properties which are required for flexographic or rotogravure printing, in terms of the final properties of the printed films with respect to print quality and aesthetics, color, opacity, ink adhesion and lamination properties, barrier properties, pigment dispersion, special effects, blocking requirements, sealing properties, surface resistance, drying, and myriad others. The colorant is selected to provide a typical full gamut of hues typical of flexographic and rotogravure printing, and to be consistent the ratio can be between about 0.40 to about 0.90, between about 0.50 to about 0.80, or between about 0.60 to about 0.75.

Example-1

Four flexographic inks with different pinholing performances were investigated. The inks are identified below as Inks 1, 2, 3, and 4. The inks' compositions are listed in Table 1.

TABLE 1

|  | Ink 1 | Ink 2 | Ink 3 | Ink 4 |
| --- | --- | --- | --- | --- |
| Solvents | n-Propyl alcohol<br>n-Propyl acetate<br>Isopropyl acetate<br>Propylene glycol monoalkyl ether | n-Propyl alcohol<br>n-Propyl acetate<br>Diacetone alcohol<br>Propylene glycol monoalkyl ether | n-Propyl alcohol<br>n-Propyl acetate<br>Diacetone alcohol<br>Propylene glycol monoalkyl ether | n-Propyl alcohol<br>Propylene glycol monoalkyl ether<br>Diacetone alcohol<br>Dipropylene glycol monoalkyl ether |
| Resins | Polyamide<br>Nitrocellulose | Rosin Ester<br>Polyamide | Polyurethane | Rosin ester<br>Polyamide | with the required properties and print quality as noted above. The inks of the present invention will contain various additives, such as slip agents, waxes, plasticizer, slip additive, defoamer, adhesion promoter, biocide, and others typically used in flexographic and rotogravure inks to achieve required properties as described above.

The inventors of the present invention discovered that the surface tension of an ink has the impact on pinholing in the way that the higher (but still ensuring proper ink spreading and wetting) surface tension causes less pinholing. The surface tension of ink can be measured directly using one of the methods described in the literature e.g. the Wilhelmy plate method.

The measurement of the surface tension can be conducted on fresh samples at various total non-volatiles volume fractions. The total non-volatiles volume fractions range, for example, from 25% to 55%. The maximum total non-volatiles fraction of the ink is the total non-volatiles fraction when the ink is completely dried or cured. The ratio of the total non-volatiles volume fraction of the ink to the maximum total non-volatiles volume fraction of the ink can be then calculated. The ratio of the total non-volatiles volume fraction of the ink to the maximum total non-volatiles volume fraction of the ink in a press ready ink state is about 0.35 to 0.55. When the ink is completely dried or cured, the ratio of a total non-volatiles volume fraction of the ink to a maximum total non-volatiles volume fraction of the ink increases to about 1.

In one embodiment of the present invention, standard and conventional ink ingredients are used to formulate the ink for high speed printing but are selected in such a way that the surface tension of ink is high (higher than 26 mN/m; preferably higher than 28 mN/m, and more preferably higher than 30 mN/m) at various total non-volatiles volume fractions As noted above, the measurement of the surface tension is known in the art, but not its importance as a predictor of print quality. Also note that the surface tension can be determined at various total non-volatiles volume fractions, for example, from 25% to 55%. The total non-volatiles volume fractions can then be used to calculate various ratios of the total non-volatiles volume fraction of the ink to the maximum total non-volatiles volume fraction. Preferably, the surface tension is measure when the ratio is from 0.35 to 1.0, because the ratio in a press ready ink state is about 0.35 to 0.55 and the ratio ink in a completely dried or cured ink is about 1. More preferably, The choice of specific solvents and actual percentages are developed by consideration of the following two guiding principles: solubility behavior of resin blends in the solvent combinations throughout drying process and the evaporative profiles of the combined solvent blends define the evolution of composition.

Figure 2:
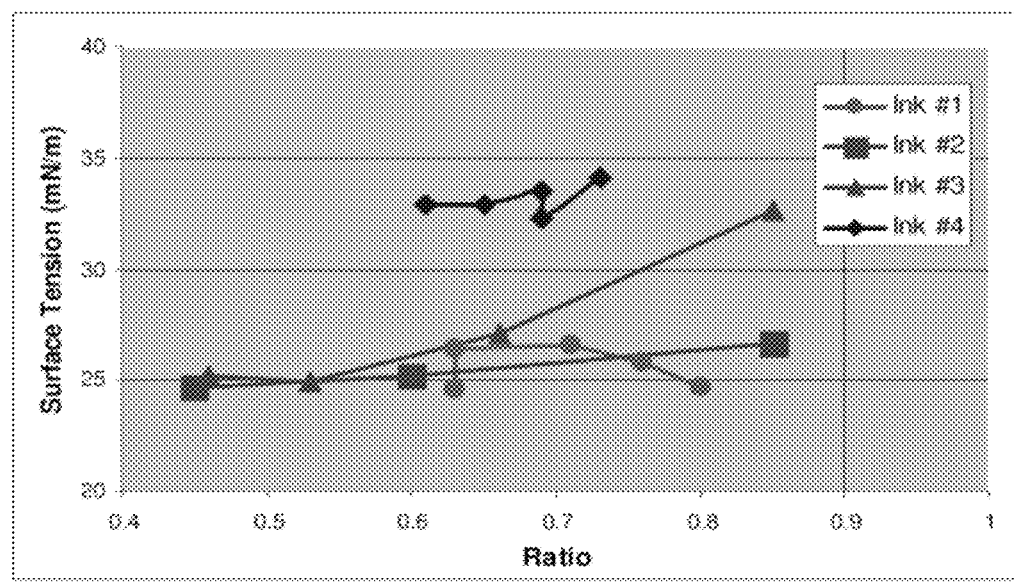
FIG. 2 shows the plot of the surface tension of the four inks (#1-4) as a function of the ratio, where the ratio denotes the ratio of the total non-volatiles volume to the maximum total non-volatiles volume fraction.

Surface tensions of these inks were obtained at various total non-volatiles volume fractions (TNV). The solvents were extracted using a rotovap to increase the total non-volatiles fraction and simulate the drying process after the transfer of the ink. The Wilhelmy plate method was carried out. The surface tensions of the four inks were obtained and are shown in FIG. 1, which plots the surface tension in mN/m as a function of TNV (%) (total non-volatiles), where TNV (%) (total non-volatiles) denotes the total non-volatiles volume fraction (percentage). The maximum total non-volatiles volume fractions of the four inks were measured. The ratios of the total non-volatiles volume fraction of the ink to the maximum total non-volatiles volume fraction of the ink were then calculated. FIG. 2 plots the surface tension in mN/m as a function of the ratio where the ratio denotes the ratio of the total non-volatiles volume fraction of the ink to the maximum total non-volatiles volume fraction of the ink.

Figure 3:
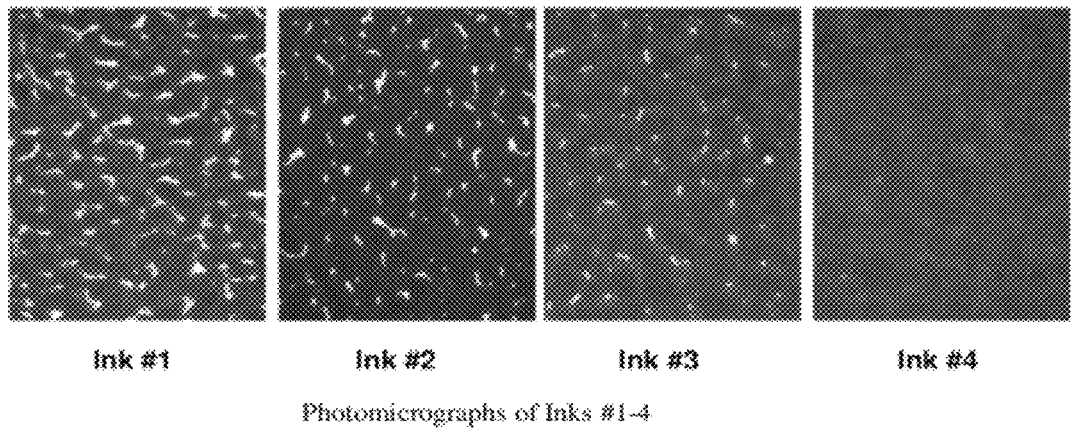
FIG. 3 shows the photomicrographs of the four inks (#1-4).

The photomicrographs of the prints of the four inks at 1800 ft/min (ca 9 m/s) are shown in FIG. 3. The photomicrographs were captured using Olympus Vanox research microscope (5× objective—area 1.5 mm×1.2 mm). The percentages of pinholes (by area) in the prints were measured using Olympus AnalySIS software for image analysis, and are listed in Table 2.

TABLE 2

|  | Ink 1 | Ink 2 | Ink 3 | Ink 4 |
| --- | --- | --- | --- | --- |
| Pinholes (%) | 8.5 | 4.6 | 2.2 | 0.5 |

The less pinholes (%) (by area), the better printing quality. A pinholes (%) (by area) of less than 1% is generally considered the best performance. Of the four inks, Ink 4 provides the best printing quality at 1800 ft/min, and Ink 1 provides the poorest printing quality. It can also be seen that the highest surface tension corresponds to the best pin-holing performance (least pin-holing). As the level of surface tension decreases, the pin-holing performance deteriorates.

Example-2

Two blue inks with different pinholing performances were investigated. The inks are identified below as Inks A and B The inks' compositions are listed in Table 3.

TABLE 3

|  | Ink A | Ink B |
|---|---|---|
| Solvents | n-Propyl Alcohol<br>Ethyl Acetate<br>n-Propyl Acetate<br>Propylene Glycol Monoalkyl Ether<br>Dipropylene Glycol Monoalkyl Ether | n-Propyl Alcohol<br>n-Propyl Acetate<br>Propylene Glycol monoalkyl Ether Acetate<br>Propylene Glycol Monoalkyl Ether |
| Resins | Nitrocellulose<br>Polyurethane | Nitrocellulose<br>Polyurethane<br>Epoxy |

Figure 4:
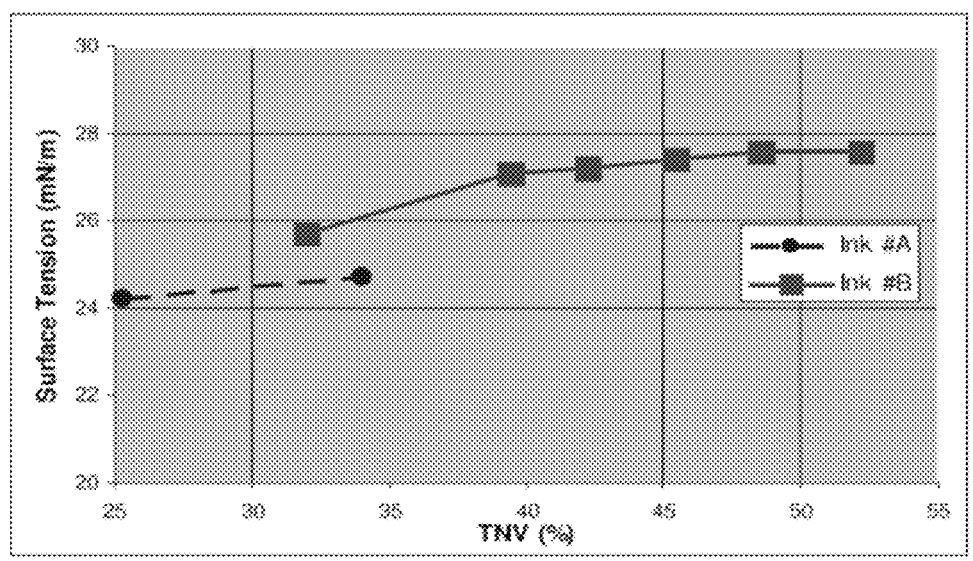
FIG. 4 shows the plot of the surface tension of the two inks (A and B) as a function of TNV (%), where TNV (%) denotes the total non-volatiles volume fraction (percentage).
Figure 5:
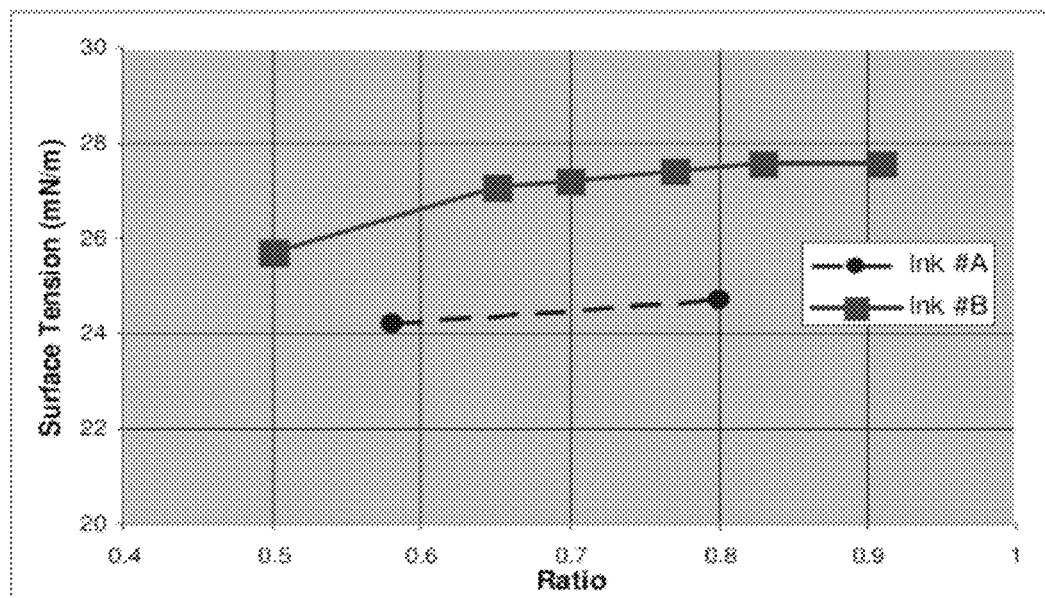
FIG. 5 shows the plot of the surface tension of the two inks (A and B) as a function of the ratio, where the ratio denotes the ratio of the total non-volatiles volume to the maximum total non-volatiles volume fraction.

Surface tensions of these two inks were obtained at various total non-volatiles volume fractions (vol % TNV). The solvents were extracted using a rotovap to increase the total non-volatiles fraction and simulate the drying process after the transfer of the ink. The Wilhelmy plate method was carried out. The surface tensions of the two inks were obtained and are shown in FIG. 4, which plots the surface tension in mN/m as a function of TNV (%) (total non-volatiles) where TNV (%) (total non-volatiles) denotes the total non-volatiles volume fraction (percentage). The maximum total non-volatiles volume fractions of the two inks were measured. The ratios of the total non-volatiles volume fraction of the ink to the maximum total non-volatiles volume fraction of the ink were then calculated. FIG. 5 plots the surface tension in mN/m as a function of the ratio where the ratio denotes the ratio of the total non-volatiles volume fraction of the ink to the maximum total non-volatiles volume fraction of the ink.

Figure 6:
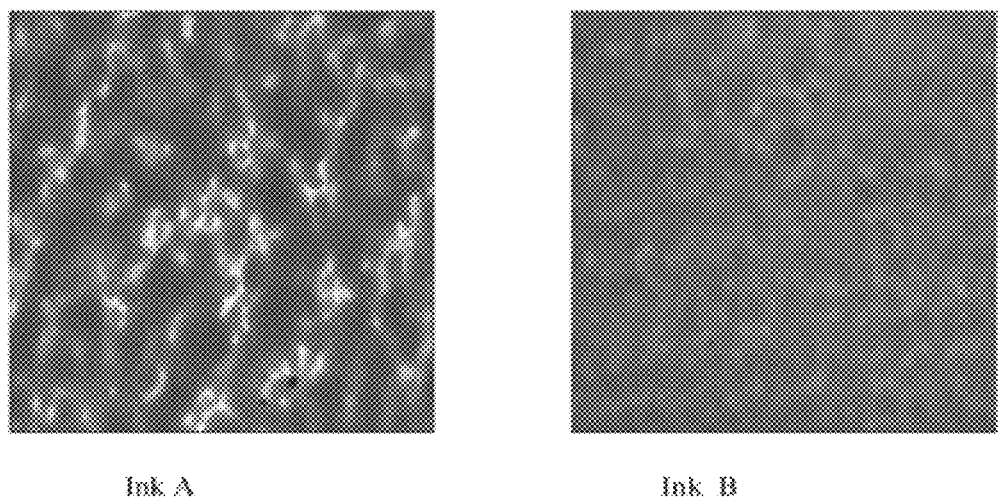
FIG. 6 shows the photomicrographs of the two inks (A and B).

The photomicrographs of the prints of the two inks at 1800 ft/min are shown in FIG. 6. The photomicrographs were captured using Olympus Vanox research microscope (5× objective—area 1.5 mm×1.2 mm). The percentages of pinholes (by area) in the prints were measured using Olympus AnalySIS software for image analysis, and are listed in Table 4.

TABLE 4

|  | Ink A | Ink B |
|---|---|---|
| Pinholes (%) | 8.4 | 0.3 |

Of the two inks, Ink B provides the best printing quality at 1800 ft/min, and Ink A provides the poorer printing quality. It can also be seen that the higher surface tension corresponds to the better pin-holing performance (least pin-holing). As the level of surface tension decreases, the pin-holing performance deteriorates.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of formulating ink for high-speed printing comprising:
measuring the surface tension of the ink, and
controlling the surface tension of the ink to equal to or greater than 26 mN/m; and
wherein the surface tension is controlled by measuring the surface tension when the ratio of the total non-volatiles volume fraction of the ink to the maximum total non-volatiles volume fraction of the ink is a ratio between about 0.40 and about 0.90.

2. The method according to claim 1, wherein the surface tension is controlled to equal to or greater than 28 mN/m.

3. The method according to claim 1, wherein the surface tension is controlled to equal to or greater than 30 mN/m.

4. The method according to claim 1, wherein the surface tension is controlled when the ratio of the total non-volatiles volume fraction of the ink to the maximum total non-volatiles volume fraction of the ink is a ratio between about 0.50 and about 0.80.

5. The method according to claim 1, wherein the surface tension is controlled when the ratio of the total non-volatiles volume fraction of the ink to the maximum total non-volatiles volume fraction of the ink is a ratio between about 0.60 and about 0.75.

6. The method according to claim 1, wherein the ink is a flexographic ink, a rotogravure ink, a heatset offset ink, or a publication gravure ink.

7. An ink for high-speed printing comprising:
one or more resins;
one or more colorants;
one or more solvents; and
one or more additives,
and the ink exhibits a controlled surface tension which is equal to or greater than 26 mN/m; and
wherein the controlled surface tension is the surface tension of the ink measured when the ratio of the total non-volatiles volume fraction of the ink to the maximum total non-volatiles volume fraction of the ink is a ratio between about 0.40 and about 0.90.

8. The ink according to claim 7, wherein the surface tension is equal to or greater than 28 mN/m.

9. The ink according to claim 7, wherein the surface tension is equal to or greater than 30 mN/m.

10. The ink according to claim 7, wherein the ink is a flexographic ink, a rotogravure ink, a heatset offset ink, or a publication gravure ink.

11. The ink according to claim 7, wherein the one or more resins are selected from the group consisting of polyamides, polyurethanes, rosin esters, metallized rosin esters, nitrocellulose, phenolic resins, modified rosin phenolic resins, alkyds, hydrocarbon resins, asphalts, and metallic resonates, and the one or more resins are about 5 to 30 wt % of the ink.

12. The ink according to claim 7, wherein the one or more colorants are about 4 to 25 wt % of the ink.

13. The ink according to claim 7, wherein the one or more solvents are selected from the group consisting of water, ethanol, normal propyl alcohol, normal propylacetate, isopropylacetate, ethylacetate, diacetone alcohol, propylene glycol monopropyl ether, dipropylene glycol monopropyl ether, propylene glycol monopropyl ether acetate, dipropylene glycol monopropyl ether acetate, petroleum distillates, toluene, and xylenes, and the one or more solvents are about 40 to 70 wt % of the ink.

14. The ink according to claim 7, wherein the controlled surface tension is the surface tension of the ink measured when the ratio of the total non-volatiles volume fraction of the ink to the maximum total non-volatiles volume fraction of the ink is a ratio between about 0.50 and about 0.80.

15. The ink according to claim 7, wherein the controlled surface tension is the surface tension of the ink measured when the ratio of the total non-volatiles volume fraction of the ink to the maximum total non-volatiles volume fraction of the ink is a ratio between about 0.60 and about 0.90.

16. The ink according to claim 7, wherein a print of the ink includes less than 1% of pinholes by area.

17. A method of printing comprising:
preparing an ink, the ink having a controlled surface tension of equal to or greater than 26 mN/m, and
applying the ink to a moving substrate, the substrate moving at a speed of greater than 1200 feet/min; and
controlling the surface tension of the ink by measuring the surface tension of the ink when the ratio of the total non-volatiles volume fraction of the ink to the maximum total non-volatiles volume fraction of the ink is a ratio between about 0.40 and about 0.90.

18. The method according to claim 17, wherein the surface tension is equal to or greater than 28 mN/m.

19. The method according to claim 17, wherein the surface tension is equal to or greater than 30 mN/m.

20. The method according to claim 17, wherein the controlled surface tension is the surface tension measured when the ratio of the total non-volatiles volume fraction of the ink to the maximum total non-volatiles volume fraction of the ink is a ratio between about 0.50 and about 0.80.

21. The method according to claim 17, wherein the controlled surface tension is the surface tension measured when the ratio of the total non-volatiles volume fraction of the ink to the maximum total non-volatiles volume fraction of the ink is a ratio between about 0.60 and about 0.75.

22. A process for the formulation of a high-speed printing ink comprising formulating an ink; controlling the surface tension of the ink by measuring the surface tension of the ink to equal to or greater than about 26 mN/m; and wherein the surface tension is controlled by measuring the surface tension when the ratio of the total non-volatiles volume fraction of the ink to the maximum total non-volatiles volume fraction of the ink is a ratio between about 0.40 and about 0.90.

23. An ink for a high-speed printing comprising one or more resins; one or more colorants; one or more solvents; and one or more additives; wherein the ink exhibits a controlled surface tension, that is equal to or greater than, about 26 mN/m; wherein the controlled surface tension of the ink is the surface tension of the ink measured when the ratio of the total non-volatiles volume fraction of the ink to the maximum total non-volatiles volume fraction of the ink is a ratio between about 0.40 and about 0.90; and, wherein the ink once printed, the resulting print of the ink has less than about 1% of pinholes by area.

24. A process of high-speed printing comprising preparing an ink, the ink having a controlled surface tension of equal to or greater than about 26 mN/m; applying the ink to a substrate, that is in motion, where the movement of the substrate is at a speed of greater than about 1200 feet/min; and the controlled surface tension of the ink is the surface tension of the ink measured when the ratio of the total non-volatiles volume fraction of the ink to the maximum total non-volatiles volume fraction of the ink is a ratio between about 0.40 and about 0.90.

25. The process of any of claim 22 or claim 24, wherein the ink once printed, the resulting print of the ink has less than about 1% of pinholes by area.

* * * * *